United States Patent
He et al.

(10) Patent No.: US 8,208,588 B2
(45) Date of Patent: Jun. 26, 2012

(54) SINGLE-CARRIER/MULTI-CARRIER COMMUNITY RECEIVER AND RELATED SIGNAL PROCESSING METHOD

(75) Inventors: Wei-Hung He, Kaohsiung (TW); Hou-Wei Lin, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 177 days.

(21) Appl. No.: 12/620,608

(22) Filed: Nov. 18, 2009

(65) Prior Publication Data
US 2010/0124268 A1    May 20, 2010

(30) Foreign Application Priority Data
Nov. 18, 2008    (TW) ................................. 97144527 A

(51) Int. Cl.
*H04B 14/06*    (2006.01)
(52) U.S. Cl. ......... 375/346; 375/232; 375/230; 375/316
(58) Field of Classification Search .................. 375/346, 375/232, 230, 316; 327/310, 384, 551
See application file for complete search history.

(56) References Cited

U.S. PATENT DOCUMENTS

| | | | | |
|---|---|---|---|---|
| 6,047,022 A | * | 4/2000 | Reuven | 375/222 |
| 7,469,025 B2 | * | 12/2008 | Tsatsanis et al. | 375/350 |
| 7,720,183 B2 | * | 5/2010 | Tseng et al. | 375/346 |
| 2006/0153283 A1 | * | 7/2006 | Scharf et al. | 375/148 |
| 2007/0053453 A1 | * | 3/2007 | Yeh et al. | 375/260 |
| 2008/0075209 A1 | * | 3/2008 | Li et al. | 375/347 |
| 2008/0304558 A1 | * | 12/2008 | Zhu et al. | 375/233 |
| 2010/0091904 A1 | * | 4/2010 | Wang et al. | 375/296 |

* cited by examiner

*Primary Examiner* — Shuwang Liu
*Assistant Examiner* — Helene Tayong
(74) *Attorney, Agent, or Firm* — Thomas, Kayden, Horstemeyer & Risley, LLP

(57) ABSTRACT

A single-carrier/multi-carrier community receiver includes a discrete Fourier transform unit, a frequency-domain equalizer, an inverse discrete Fourier transform unit and an inter-symbol interference (ISI) cancellation unit. The discrete Fourier transform unit is utilized for executing a discrete Fourier transform upon a received signal to generate a frequency-domain signal. The frequency-domain equalizer is utilized for executing an equalization operation upon the frequency-domain signal to generate a frequency-domain equalized signal. The inverse discrete Fourier transform unit is utilized for executing an inverse discrete Fourier transform upon the frequency-domain equalized signal to generate a time-domain equalized signal. The ISI cancellation unit is utilized for executing an ISI cancellation operation upon the time-domain equalized signal to generate an ISI-cancelled signal.

14 Claims, 2 Drawing Sheets

SINGLE-CARRIER/MULTI-CARRIER COMMUNITY RECEIVER AND RELATED SIGNAL PROCESSING METHOD

BACKGROUND OF THE INVENTION

1. Field of the Invention

The invention relates to a single-carrier/multi-carrier community receiver, and more particularly, to a single-carrier/multi-carrier community receiver having an inter-symbol interference (ISI) cancellation unit, and a signal processing method thereof.

2. Description of the Prior Art

In a single-carrier receiver, a decision feedback equalizer is generally used to eliminate channel effects and to improve a "deep fading" issue at certain frequencies. However, when the channel is long, the decision feedback equalizer needs many tap coefficients, and computation complexity is therefore increased.

In order to lower the computation complexity, in certain single-carrier/multi-carrier community receivers, a single-carrier signal performs an equalization operation utilizing a frequency-domain equalizer as a multi-carrier signal rather than a conventional decision feedback equalizer. However, because the frequency-domain equalizer cannot directly use a decision feedback method upon the received signal, the function of the frequency-domain equalizer is similar to a linear equalizer and is unable to eliminate the ISI efficiently.

SUMMARY OF THE INVENTION

It is therefore an objective of the present invention to provide a single-carrier/multi-carrier community receiver, which can cancel the ISI without greatly increasing the computation complexity, to solve the above-mentioned problem.

According to one aspect of the present invention, a single-carrier/multi-carrier community receiver includes a discrete Fourier transform unit, a frequency-domain equalizer, an inverse discrete Fourier transform unit and an inter-symbol interference (ISI) cancellation unit. The discrete Fourier transform unit is utilized for executing a discrete Fourier transform upon a received signal to generate a frequency-domain signal. The frequency-domain equalizer is utilized for executing an equalization operation upon the frequency-domain signal to generate a frequency-domain equalized signal. The inverse discrete Fourier transform unit is utilized for executing an inverse discrete Fourier transform upon the frequency-domain equalized signal to generate a time-domain equalized signal. The ISI cancellation unit is utilized for executing an ISI cancellation operation upon the time-domain equalized signal to generate an ISI-cancelled signal.

According to another aspect of the present invention, a signal processing method includes: executing a discrete Fourier transform upon a received signal to generate a frequency-domain signal; executing an equalization operation upon the frequency-domain signal to generate a frequency-domain equalized signal; executing an inverse discrete Fourier transform upon the frequency-domain equalized signal to generate a time-domain equalized signal; and executing an ISI cancellation operation upon the time-domain equalized signal to generate an ISI-cancelled signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
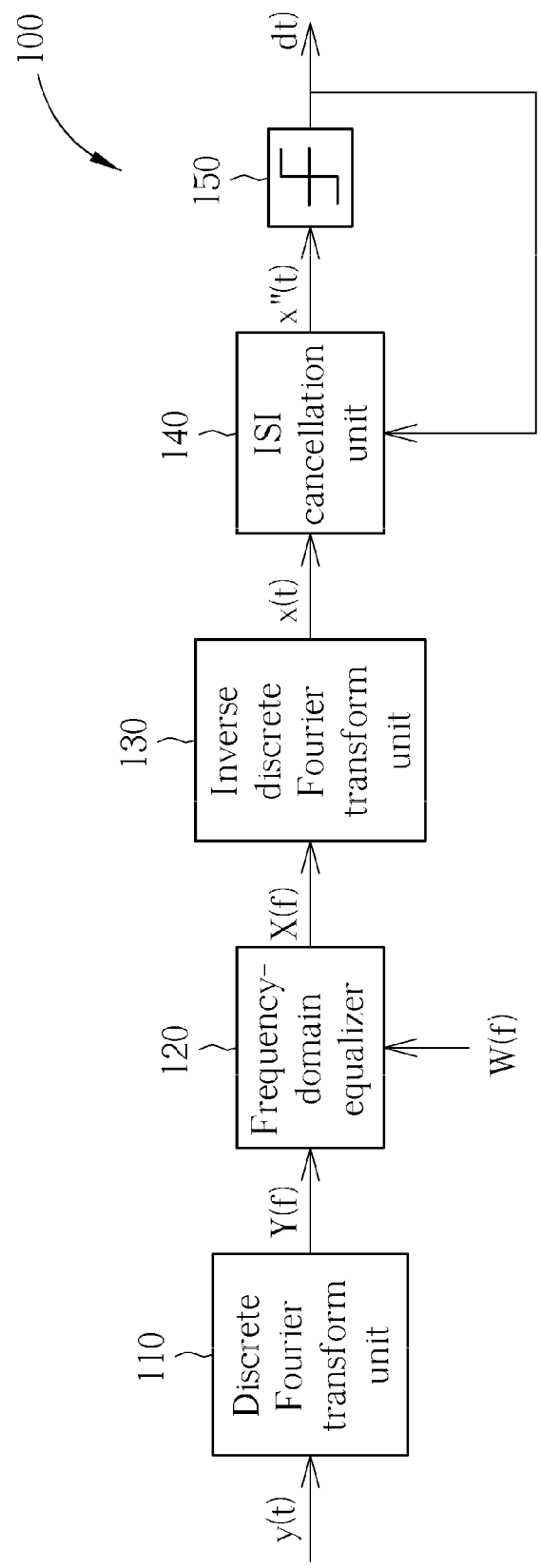
FIG. 1 is a diagram illustrating a single-carrier/multi-carrier community receiver according to one embodiment of the present invention.

FIG. 1 is a diagram illustrating a single carrier/multi-carrier community receiver 100 according to one embodiment of the present invention. As shown in FIG. 1, the receiver 100 includes a discrete Fourier transform unit 110, a frequency-domain equalizer 120, an inverse discrete Fourier transform unit 130, an inter-symbol interference (ISI) cancellation unit 140 and a data slicer 150.

In the operations of the receiver 100, first, the discrete Fourier transform unit 110 executes a discrete Fourier transform upon a single-carrier received signal y(t) to generate a frequency-domain signal Y(f). After that, the frequency-domain equalizer 120 executes an equalization operation upon the frequency-domain signal Y(f) to generate a frequency-domain equalized signal X(f). Then, the inverse discrete Fourier transform unit 130 executes an inverse discrete Fourier transform upon the frequency-domain equalized signal X(f) to generate a time-domain equalized signal x(t), and the ISI cancellation unit 140 executes an ISI cancellation operation upon the time-domain equalized signal x(t) to generate an ISI-cancelled signal x"(t). Finally, the data slicer 150 slices the ISI-cancelled signal x"(t) to generate a digital signal d(t).

In addition, the frequency-domain equalizer 120 generates the frequency-domain equalized signal X(f) by multiplying the frequency-domain signal Y(f) and a coefficient W(f) of the frequency-domain equalizer 120:

$$X(f)=W(f)*Y(f).$$

Generally, the coefficient of an equalizer is a reciprocal of a frequency response H(f) of a channel (i.e., W(f)=1/H(f)). However, this coefficient can easily magnify the noise at a band whose frequency response H(f) is small. Therefore, in this embodiment, the frequency-domain equalizer 120 is a minimum mean squared error equalizer. The coefficient W(f) of the frequency-domain equalizer 120 is:

$$W(f)=H(f)/(|H(f)|^2+K*E\lfloor|N(f)|^2\rfloor),$$

where K is a constant and $E\lfloor|N(f)|^2\rfloor$ is an expected value of noise power. However, although the minimum mean squared error equalizer can avoid magnifying the noise at the band whose frequency response H(f) is small, the time-domain equalized signal x(t) will have the ISI, and an accuracy of the digital signal d(t) is influenced. Therefore, the ISI cancellation unit 140 of the present invention is used to cancel the ISI due to the use of the minimum mean squared error equalizer.

Figure 2:
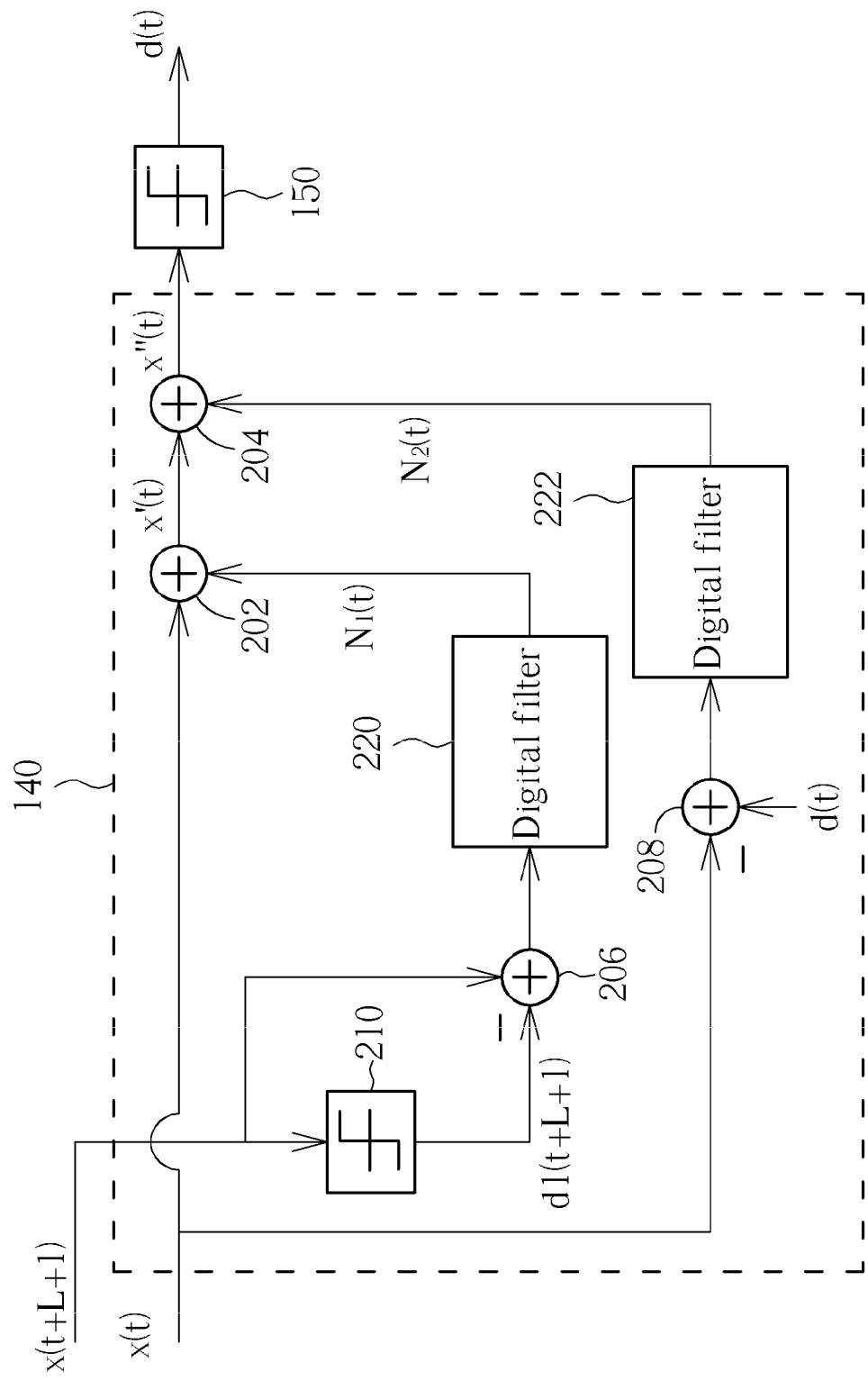
FIG. 2 is a diagram illustrating an ISI cancellation unit shown in FIG. 1

Please refer to FIG. 2. FIG. 2 is a diagram illustrating the ISI cancellation unit 140. As shown in FIG. 2, the ISI cancellation unit 140 includes adders 202, 204, 206 and 208, a data slicer 210, and digital filters 220 and 222. The operations of the ISI cancellation unit 140 are described in the following.

First, assume that the ISI cancellation unit 140 is used to execute an ISI cancellation operation upon the time-domain equalized signal x(t) at a time point (t) to generate the ISI-cancelled signal x"(t). At the same time, the data slicer 210 slices a time-domain equalized signal x(t+L+1) corresponding to a time point (t+L+1) to generate a sliced time-domain signal d1(t+L+1), where L is an integer. The time-domain equalized signal x(t+L+1) is a value of the time-domain equalized signal after the time (t). Then, the adder 206 calculates a difference between the time-domain equalized signal x(t+L+1) and the sliced time-domain signal d1 (t+L+1). The meaning of this difference is a summation of the noise and the ISI of the time-domain equalized signal x(t+L+1) at the time point (t+L+1). Then, the difference enters a tapped-delay-line of the digital filter 220. At this time, the tapped-delay-lines of the digital filter 220 store the noise and the ISI corresponding to the time-domain equalized signal x(t+1) to x(t+L), respectively. A vector $p_1(t)$ is used to define the data stored in the tapped-delay-lines of the digital filter 220:

$$p_1(t)=[(x(t+1)-d1(t+1)),(x(t+2)-d1(t+2)), \ldots ,(x(t+L)-d1(t+L))].$$

After that, the digital filter 220 executes an inner-product calculation upon the vector $p_1(t)$ and coefficients with $w_1(t)$ of the digital filter 220 to output a filtered signal $N_1(t)$. The adder 202 then calculates a difference between the time-domain equalized signal x(t) and the filtered signal $N_1(t)$ to generate a preliminary ISI-cancelled signal x'(t).

At the same time, the adder 208 calculates a difference between the time-domain equalized signal x(t) and the digital signal d(t). The meaning of this difference is a summation of the noise and the ISI of the time-domain equalized signal x(t) at the time (t). Then, the difference enters a tapped-delay-line of the digital filter 222. At this time, the tapped-delay-lines of the digital filter 222 store the noise and the ISI corresponding to the time-domain equalized signal x(t-1) to x(t-M), respectively, where M is a tap number of the digital filter 222. A vector $p_2(t)$ is provided to define the data stored in the tapped-delay-lines of the digital filter 222:

$$p_2(t)=[(x(t-1)-d(t-1)),(x(t-2)-d(t-2)), \ldots ,(x(t-M)-d(t-M))].$$

Then, the digital filter 222 executes an inner-product calculation upon the vector $p_2(t)$ and coefficients $w_2(t)$ of the digital filter 222 to output a filtered signal $N_2(t)$, and the adder 204 calculates a difference between the preliminary ISI-cancelled signal x'(t) and the filtered signal $N_2(t)$ to generate the ISI-cancelled signal x"(t).

It is noted that the above step of obtaining the ISI-cancelled signal x"(t) according to the filtered signals $N_1(t)$ and $N_2(t)$ is merely an embodiment of the present invention. In other embodiments of the present invention, the ISI-cancelled signal x"(t) can be obtained by calculating the difference between the time-domain equalized signal x(t) and the filtered signal $N_2(t)$ to generate a preliminary ISI-cancelled signal x'(t), and then calculating the difference between the preliminary ISI-cancelled signal x'(t) and the filtered signal $N_1(t)$; additionally, the ISI-cancelled signal x"(t) can also be obtained by calculating the difference between the time-domain equalized signal x(t) and a summation of the filtered signals $N_1(t)$ and $N_2(t)$ (i.e., $(N_1(t)+N_2(t))$). These alternative designs also fall within the scope of the present invention.

In addition, the ISI-cancelled signal x"(t) can also be obtained by calculating the difference between the time-domain equalized signal x(t) and the filtered signal $N_1(t)$ or by calculating the difference between the time-domain equalized signal x(t) and the filtered signal $N_2(t)$. That is, in the ISI cancellation unit 140 shown in FIG. 2, one of the components related to the filtered signal $N_1(t)$ (i.e., the data slicer 210, the adders 202 and 206, and the digital filter 220) and the components related to the filtered signal $N_2(t)$ (i.e., the adders 204 and 208, and the digital filter 222) can be removed.

In the present invention, if the appropriate coefficients $w_1(t)$ and $w_2(t)$ are found, the summation of the filtered signals $N_1(t)$ and $N_2(t)$ are similar to the ISI of the time-domain equalized signal x(t). Therefore, the ISI of the time-domain equalized signal x(t) can be cancelled by subtracting the filtered signals $N_1(t)$ and $N_2(t)$ from the time-domain equalized signal x(t), and the accuracy of the digital signal d(t) is thereby highly increased.

In addition, the coefficients $w_1(t)$ and $w_2(t)$ of the digital filters 220 ad 222 can be obtained by using a least mean square method (LMS method). For example, first, $w_1(t)$ and $w_2(t)$ are initially defined as follows:

$$w_1(t)=[w(t,1),w(t,2), \ldots , w(t,L)];$$

$$w_2(t)=[w(t,-1),w(t,-2), \ldots , w(t,-M)];$$

then $w_1(t)$ and $w_2(t)$ are modified by the LMS method as follows:

$$w_1(t)=w_1(t-1)+R*p_1(t)*\text{conj}(d(t)-x''(t));$$

$$w_2(t)=w_2(t-1)+S*p_2(t)*\text{conj}(d(t)-x''(t));$$

where R and S are constants, and conj( ) is an operation of complex conjugate.

In addition, the above steps of determining the coefficients $w_1(t)$ and $w_2(t)$ of the digital filters 220 ad 222 are merely one embodiment of the present invention. In other embodiments, the coefficients $w_1(t)$ and $w_2(t)$ can be determined by a recursive least square method (RLS method) or other algorithms, and these alternative designs all fall within the scope of the present invention.

It is noted that the receiver 100 of the present invention generates the filtered signals $N_1(t)$ and $N_2(t)$ according to the values of the time-domain equalized signal corresponding to a plurality of time points after the current time (t) and the values of the time-domain equalized signal corresponding to a plurality of time points before the current time (t), where the summation of the filtered signals $N_1(t)$ and $N_2(t)$ are similar to the ISI of the time-domain equalized signal x(t). However, in other embodiments of the present invention, the receiver of the present invention only uses the filtered signal $N_1(t)$ or the filtered signal $N_2(t)$ to approximate the ISI of the time-domain equalized signal x(t). For simplicity, in another embodiment of the present invention, the adders 204 and 208, and the digital filter 222 can be removed from the receiver 100; that is, the preliminary ISI-cancelled signal x'(t) serves as the ISI-cancelled signal x"(t), and the data slicer 150 slices the preliminary ISI-cancelled signal x'(t) to generate the digital signal d(t). In addition, in another embodiment of the present invention, the adders 202 and 206, the data slicer 210, and the digital filter 220 are removed; that is, the adder 204 calculates a difference between the time-domain equalized signal x(t) and the filtered signal $N_2(t)$ to generate the ISI-cancelled signal x"(t). These alternative designs all fall within the scope of the present invention.

Briefly summarized, the single-carrier/multi-carrier community receiver includes a discrete Fourier transform unit, a frequency-domain equalizer, an inverse discrete Fourier transform unit and an ISI cancellation unit. When the receiver receives a single-carrier signal, because the frequency-domain equalizer cannot eliminate the ISI of the single-carrier signal, the ISI cancellation unit of the present invention is used to cancel this ISI. Therefore, the following data slicing operations are more accurate.

Those skilled in the art will readily observe that numerous modifications and alterations of the device and method may be made while retaining the teachings of the invention.

What is claimed is:

1. A single-carrier/multi-carrier community receiver, comprising:
   a discrete Fourier transform unit, for executing a discrete Fourier transform upon a received signal to generate a frequency-domain signal;
   a frequency-domain equalizer, coupled to the discrete Fourier transform unit, for executing an equalization operation upon the frequency-domain signal to generate a frequency-domain equalized signal;
   an inverse discrete Fourier transform unit, coupled to the frequency-domain equalizer, for executing an inverse discrete Fourier transform upon the frequency-domain equalized signal to generate a time-domain equalized signal; and
   an inter-symbol interference (ISI) cancellation unit, coupled to the inverse discrete Fourier transform unit, for executing an ISI cancellation operation upon the time-domain equalized signal to generate an ISI-cancelled signal, wherein the ISI cancellation unit comprises:
      a first data slicer, for slicing the time-domain equalized signal to generate a sliced time-domain signal;
      a first adder, for calculating a difference between the time-domain equalized signal and the sliced time-domain signal;
      a first digital filter, for generating a first filtered signal according to a plurality of differences generated from the first adder at different time points: and
      a second adder, for calculating a difference between the time-domain equalized signal and the first filtered signal to generate a preliminary ISI-cancelled signal which corresponds to the ISI-cancelled signal.

2. The receiver of claim 1, wherein the second adder calculates the difference between the time-domain equalized signal corresponding to a current time point and the first filtered signal to generate a preliminary ISI-cancelled signal, and the plurality of differences are generated according to values of the time-domain equalized signal corresponding to a plurality of time points after the current time point.

3. The receiver of claim 2, wherein the preliminary ISI-cancelled signal serves as the ISI-cancelled signal, and the receiver further comprises:
   a second data slicer, for slicing the preliminary ISI-cancelled signal to generate a digital signal.

4. The receiver of claim 2, further comprising:
   a second data slicer, for slicing the ISI-cancelled signal to generate a digital signal; and
   the ISI cancellation unit further comprises:
      a third adder, for calculating a difference between the time-domain equalized signal and the digital signal;
      a second digital filter, for generating a second filtered signal according to a plurality of differences generated from the third adder at different time points; and
      a fourth adder, for calculating a difference between the preliminary ISI-cancelled signal and the second filtered signal to generate the ISI-cancelled signal.

5. The receiver of claim 4, wherein the fourth adder calculates the difference between the preliminary ISI-cancelled signal corresponding to the current time point and the second filtered signal to generate the ISI-cancelled signal, and the plurality of differences outputted from the third adder are generated according to values of the time-domain equalized signal corresponding to a plurality of time points before the current time point.

6. The receiver of claim 4, wherein coefficients of the first digital filter and the second digital filter are obtained by using a least mean square method (LMS method).

7. The receiver of claim 1, wherein the frequency-domain equalizer is a minimum mean squared error equalizer.

8. The receiver of claim 1, wherein a coefficient of the first digital filter is obtained by using a least mean square method (LMS method).

9. A signal processing method, comprising:
   executing a discrete Fourier transform upon a received signal to generate a frequency-domain signal;
   executing an equalization operation upon the frequency-domain signal to generate a frequency-domain equalized signal;
   executing an inverse discrete Fourier transform upon the frequency-domain equalized signal to generate a time-domain equalized signal; and
   executing an ISI cancellation operation upon the time-domain equalized signal to generate an ISI-cancelled signal, wherein executing the ISI cancellation operation comprises:
      providing a first data slicer to slice the time-domain equalized signal to generate a sliced time-domain signal;
      providing a first adder to calculate a difference between the time-domain equalized signal and the sliced time-domain signal;
      generating a first filtered signal according to a plurality of differences generated from the first adder at different time points; and
      calculating a difference between the time-domain equalized signal and the first filtered signal to generate a preliminary ISI-cancelled signal which corresponds to the ISI-cancelled signal.

10. The signal processing method of claim 9, wherein the step of executing the ISI cancellation operation upon the time-domain equalized signal to generate the ISI-cancelled signal further comprises:
   calculating the difference between the time-domain equalized signal corresponding to a current time point and the first filtered signal to generate a preliminary ISI-cancelled signal, wherein the plurality of differences are generated according to values of the time-domain equalized signal corresponding to a plurality of time points after the current time point.

11. The signal processing method of claim 10, wherein the preliminary ISI-cancelled signal serves as the ISI-cancelled signal, and the signal processing method further comprises:
   slicing the preliminary ISI-cancelled signal to generate a digital signal.

12. The signal processing method of claim 10, further comprising:
   slicing the ISI-cancelled signal to generate a digital signal; and
   the step of executing the ISI cancellation operation upon the time-domain equalized signal to generate the ISI-cancelled signal further comprises:
      providing a second adder, for calculating a difference between the time-domain equalized signal and the digital signal;
      generating a second filtered signal according to a plurality of differences generated from the second adder at different time points; and
      calculating a difference between the preliminary ISI-cancelled signal and the second filtered signal to generate the ISI-cancelled signal.

13. The signal processing method of claim 12, wherein the step of executing the ISI cancellation operation upon the time-domain equalized signal to generate the ISI-cancelled signal further comprises:

calculating the difference between the preliminary ISI-cancelled signal corresponding to the current time point and the second filtered signal to generate the ISI-cancelled signal, wherein the plurality of differences outputted from the second adder are generated according to values of the time-domain equalized signal corresponding to a plurality of time points before the current time point.

14. The signal processing method of claim 9, wherein the step of executing the equalization operation upon the frequency-domain signal to generate the frequency-domain equalized signal comprises:

executing a minimum mean squared error equalization operation upon the frequency-domain signal to generate the frequency-domain equalized signal.

* * * * *